US010313269B2

(12) United States Patent
Raponi

(10) Patent No.: US 10,313,269 B2
(45) Date of Patent: Jun. 4, 2019

(54) SYSTEM AND METHOD FOR NETWORK ON CHIP CONSTRUCTION THROUGH MACHINE LEARNING

(71) Applicant: NetSpeed Systems, Inc., San Jose, CA (US)

(72) Inventor: Pier Giorgio Raponi, San Jose, CA (US)

(*) Notice: Subject to any disclaimer, the term of this patent is extended or adjusted under 35 U.S.C. 154(b) by 220 days.

(21) Appl. No.: 15/390,705

(22) Filed: Dec. 26, 2016

(65) Prior Publication Data

US 2018/0183715 A1    Jun. 28, 2018

(51) Int. Cl.
*G06F 15/173* (2006.01)
*H04L 12/933* (2013.01)
*G06N 20/00* (2019.01)
*H04L 12/937* (2013.01)

(52) U.S. Cl.
CPC ............ *H04L 49/15* (2013.01); *H04L 49/109* (2013.01); *G06N 20/00* (2019.01); *H04L 49/254* (2013.01)

(58) Field of Classification Search
CPC ...... G06N 99/005; G06N 20/00; H04L 47/22; H04L 49/109; H04L 49/15
See application file for complete search history.

(56) References Cited

U.S. PATENT DOCUMENTS

| | | |
|---|---|---|
| 4,409,838 A | 10/1983 | Schomberg |
| 4,933,933 A | 6/1990 | Daily et al. |
| 5,105,424 A | 4/1992 | Flaig et al. |
| 5,163,016 A | 11/1992 | Har'El et al. |
| 5,355,455 A | 10/1994 | Hilgendorf et al. |
| 5,432,785 A | 7/1995 | Ahmed et al. |
| 5,563,003 A | 10/1996 | Suzuki et al. |

(Continued)

FOREIGN PATENT DOCUMENTS

| | | |
|---|---|---|
| CN | 103684961 A | 3/2014 |
| JP | 5936793 | 6/2016 |

(Continued)

OTHER PUBLICATIONS

Ababei, C., et al., Achieving Network on Chip Fault Tolerance by Adaptive Remapping, Parallel & Distributed Processing, 2009, IEEE International Symposium, 4 pgs.

(Continued)

*Primary Examiner* — Mohamed Wasel
(74) *Attorney, Agent, or Firm* — Spectrum IP Law Group LLC

(57) ABSTRACT

In example implementations, the specification is processed to determine the characteristics of the NoC to be generated, the characteristics of the flow (e.g. number of hops, bandwidth requirements, type of flow such as request/response, etc.), flow mapping decision strategy (e.g., limit on number of new virtual channels to be constructed, using of existing VCs, yx/xy mapping), and desired strategy to be used for how the flows are to be mapped to the network. In such processing, the machine learning algorithm can provide a determination as to if a flow is acceptable or not in view of the specification (e.g., via a Q score). In example implementations, the machine learning decisions can be applied on a flow by flow basis, and can involve supervised learning and unsupervised learning algorithms.

19 Claims, 14 Drawing Sheets

(56) References Cited

U.S. PATENT DOCUMENTS

| | | |
|---|---|---|
| 5,583,990 A | 12/1996 | Birrittella et al. |
| 5,588,152 A | 12/1996 | Dapp et al. |
| 5,764,740 A | 6/1998 | Holender |
| 5,764,741 A | 6/1998 | Holender |
| 5,859,981 A | 1/1999 | Levin et al. |
| 5,991,308 A | 11/1999 | Fuhrmann et al. |
| 6,003,029 A | 12/1999 | Agrawal et al. |
| 6,029,220 A | 2/2000 | Iwamura et al. |
| 6,058,385 A | 5/2000 | Koza et al. |
| 6,101,181 A | 8/2000 | Passint et al. |
| 6,108,739 A | 8/2000 | James |
| 6,249,902 B1 | 6/2001 | Igusa et al. |
| 6,314,487 B1 | 11/2001 | Hahn et al. |
| 6,377,543 B1 | 4/2002 | Grover |
| 6,415,282 B1 | 7/2002 | Mukherjea et al. |
| 6,674,720 B1 | 1/2004 | Passint et al. |
| 6,711,717 B2 | 3/2004 | Nystrom et al. |
| 6,925,627 B1 | 8/2005 | Longway et al. |
| 6,967,926 B1 | 11/2005 | Williams, Jr. et al. |
| 6,983,461 B2 | 1/2006 | Hutchison et al. |
| 7,046,633 B2 | 5/2006 | Carvey |
| 7,065,730 B2 | 6/2006 | Alpert et al. |
| 7,143,221 B2 | 11/2006 | Bruce et al. |
| 7,318,214 B1 | 1/2008 | Prasad et al. |
| 7,379,424 B1 | 5/2008 | Krueger |
| 7,437,518 B2 | 10/2008 | Tsien |
| 7,461,236 B1 | 12/2008 | Wentzlaff |
| 7,509,619 B1 | 3/2009 | Miller et al. |
| 7,564,865 B2 | 7/2009 | Radulescu |
| 7,583,602 B2 | 9/2009 | Bejerano |
| 7,590,959 B2 | 9/2009 | Tanaka |
| 7,693,064 B2 | 4/2010 | Thubert et al. |
| 7,701,252 B1 | 4/2010 | Chow et al. |
| 7,724,735 B2 | 5/2010 | Locatelli et al. |
| 7,725,859 B1 | 5/2010 | Lenahan et al. |
| 7,774,783 B2 | 8/2010 | Toader |
| 7,808,968 B1 | 10/2010 | Kalmanek, Jr. et al. |
| 7,853,774 B1 | 12/2010 | Wentzlaff |
| 7,917,885 B2 | 3/2011 | Becker |
| 7,957,381 B2 | 6/2011 | Clermidy et al. |
| 7,973,804 B2 | 7/2011 | Mejdrich et al. |
| 8,018,249 B2 | 9/2011 | Koch et al. |
| 8,020,163 B2 | 9/2011 | Nollet et al. |
| 8,020,168 B2 | 9/2011 | Hoover et al. |
| 8,050,256 B1 | 11/2011 | Bao et al. |
| 8,059,551 B2 | 11/2011 | Milliken |
| 8,099,757 B2 | 1/2012 | Riedle et al. |
| 8,136,071 B2 | 3/2012 | Solomon |
| 8,203,938 B2 | 6/2012 | Gibbings |
| 8,213,298 B2 * | 7/2012 | Yamaguchi .............. H04L 45/12 370/217 |
| 8,261,025 B2 | 9/2012 | Mejdrich et al. |
| 8,281,297 B2 | 10/2012 | Dasu et al. |
| 8,306,042 B1 | 11/2012 | Abts |
| 8,312,402 B1 | 11/2012 | Okhmatovski et al. |
| 8,352,774 B2 | 1/2013 | Elrabaa |
| 8,407,425 B2 | 3/2013 | Gueron et al. |
| 8,412,795 B2 | 4/2013 | Mangano et al. |
| 8,438,578 B2 | 5/2013 | Hoover et al. |
| 8,448,102 B2 | 5/2013 | Kornachuk et al. |
| 8,490,110 B2 | 7/2013 | Hoover et al. |
| 8,492,886 B2 | 7/2013 | Or-Bach et al. |
| 8,514,889 B2 | 8/2013 | Jayasimha |
| 8,541,819 B1 | 9/2013 | Or-Bach et al. |
| 8,543,964 B2 | 9/2013 | Ge et al. |
| 8,601,423 B1 | 12/2013 | Philip et al. |
| 8,619,622 B2 | 12/2013 | Harrand et al. |
| 8,635,577 B2 | 1/2014 | Kazda et al. |
| 8,661,455 B2 | 2/2014 | Mejdrich et al. |
| 8,667,439 B1 | 3/2014 | Kumar et al. |
| 8,705,368 B1 | 4/2014 | Abts et al. |
| 8,711,867 B2 | 4/2014 | Guo et al. |
| 8,717,875 B2 | 5/2014 | Bejerano et al. |
| 8,726,295 B2 | 5/2014 | Hoover et al. |
| 8,738,860 B1 | 5/2014 | Griffin et al. |
| 8,793,644 B2 | 7/2014 | Michel et al. |
| 8,798,038 B2 | 8/2014 | Jayasimha et al. |
| 8,819,611 B2 | 8/2014 | Philip et al. |
| 9,210,048 B1 | 12/2015 | Marr |
| 9,571,341 B1 | 2/2017 | Kumar et al. |
| 2002/0071392 A1 | 6/2002 | Grover et al. |
| 2002/0073380 A1 | 6/2002 | Cooke et al. |
| 2002/0083159 A1 | 6/2002 | Ward et al. |
| 2002/0095430 A1 | 7/2002 | Egilsson et al. |
| 2003/0088602 A1 | 5/2003 | Dutta et al. |
| 2003/0145314 A1 | 7/2003 | Nguyen et al. |
| 2004/0049565 A1 | 3/2004 | Keller et al. |
| 2004/0062237 A1* | 4/2004 | MacArthur .............. H04L 45/00 370/356 |
| 2004/0103218 A1 | 5/2004 | Blumrich et al. |
| 2004/0216072 A1 | 10/2004 | Alpert et al. |
| 2005/0147081 A1 | 7/2005 | Acharya et al. |
| 2005/0203988 A1 | 9/2005 | Nollet et al. |
| 2006/0002302 A1* | 1/2006 | Bejerano ................. H04L 45/02 370/238 |
| 2006/0002303 A1 | 1/2006 | Bejerano |
| 2006/0031615 A1 | 2/2006 | Bruce et al. |
| 2006/0075169 A1 | 4/2006 | Harris et al. |
| 2006/0161875 A1 | 7/2006 | Rhee |
| 2006/0206297 A1 | 9/2006 | Ishiyama et al. |
| 2006/0209846 A1 | 9/2006 | Clermidy et al. |
| 2006/0268909 A1 | 11/2006 | Langevin et al. |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert et al. |
| 2008/0126569 A1 | 5/2008 | Rhim et al. |
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0070726 A1 | 3/2009 | Mehrotra et al. |
| 2009/0122703 A1 | 5/2009 | Gangwal et al. |
| 2009/0172304 A1 | 7/2009 | Gueron et al. |
| 2009/0187716 A1 | 7/2009 | Comparan et al. |
| 2009/0187756 A1 | 7/2009 | Nollet et al. |
| 2009/0210184 A1 | 8/2009 | Medardoni et al. |
| 2009/0231348 A1 | 9/2009 | Mejdrich et al. |
| 2009/0268677 A1 | 10/2009 | Chou et al. |
| 2009/0285222 A1 | 11/2009 | Hoover et al. |
| 2009/0300292 A1 | 12/2009 | Fang et al. |
| 2009/0307714 A1 | 12/2009 | Hoover et al. |
| 2009/0313592 A1 | 12/2009 | Murali et al. |
| 2010/0040162 A1 | 2/2010 | Suehiro |
| 2010/0158005 A1 | 6/2010 | Mukhopadhyay et al. |
| 2010/0211718 A1 | 8/2010 | Gratz et al. |
| 2010/0223505 A1 | 9/2010 | Andreev et al. |
| 2011/0022754 A1 | 1/2011 | Cidon et al. |
| 2011/0035523 A1 | 2/2011 | Feero et al. |
| 2011/0060831 A1 | 3/2011 | Ishii et al. |
| 2011/0072407 A1 | 3/2011 | Keinert et al. |
| 2011/0085550 A1 | 4/2011 | Lecler et al. |
| 2011/0085561 A1 | 4/2011 | Ahn |
| 2011/0103799 A1 | 5/2011 | Shacham et al. |
| 2011/0145646 A1* | 6/2011 | Harris .................... G06F 11/263 714/37 |
| 2011/0154282 A1 | 6/2011 | Chang et al. |
| 2011/0191774 A1 | 8/2011 | Hsu et al. |
| 2011/0235531 A1 | 9/2011 | Vangal et al. |
| 2011/0276937 A1 | 11/2011 | Waller |
| 2011/0302345 A1 | 12/2011 | Boucard et al. |
| 2011/0307734 A1 | 12/2011 | Boesen et al. |
| 2011/0320854 A1 | 12/2011 | Elrabaa |
| 2012/0022841 A1 | 1/2012 | Appleyard |
| 2012/0023473 A1 | 1/2012 | Brown et al. |

(56) References Cited

U.S. PATENT DOCUMENTS

| | | |
|---|---|---|
| 2012/0026917 A1 | 2/2012 | Guo et al. |
| 2012/0079147 A1 | 3/2012 | Ishii et al. |
| 2012/0099475 A1 | 4/2012 | Tokuoka |
| 2012/0110106 A1 | 5/2012 | De Lescure et al. |
| 2012/0110541 A1 | 5/2012 | Ge et al. |
| 2012/0144065 A1 | 6/2012 | Parker |
| 2012/0155250 A1 | 6/2012 | Carney et al. |
| 2012/0173846 A1 | 7/2012 | Wang et al. |
| 2012/0195321 A1 | 8/2012 | Ramanujam |
| 2012/0209944 A1 | 8/2012 | Mejdrich et al. |
| 2013/0028090 A1 | 1/2013 | Yamaguchi et al. |
| 2013/0028261 A1 | 1/2013 | Lee |
| 2013/0051397 A1 | 2/2013 | Guo et al. |
| 2013/0054811 A1 | 2/2013 | Harrand |
| 2013/0077562 A1* | 3/2013 | Boltz .............. H04B 7/18534 370/316 |
| 2013/0080073 A1 | 3/2013 | de Corral |
| 2013/0103369 A1 | 4/2013 | Huynh et al. |
| 2013/0103912 A1 | 4/2013 | Jones et al. |
| 2013/0117543 A1 | 5/2013 | Venkataramanan et al. |
| 2013/0148506 A1 | 6/2013 | Lea |
| 2013/0151215 A1 | 6/2013 | Mustapha |
| 2013/0159944 A1 | 6/2013 | Uno et al. |
| 2013/0163615 A1 | 6/2013 | Mangano et al. |
| 2013/0174113 A1 | 7/2013 | Lecler et al. |
| 2013/0179613 A1 | 7/2013 | Boucard et al. |
| 2013/0179902 A1 | 7/2013 | Hoover et al. |
| 2013/0191572 A1 | 7/2013 | Nooney et al. |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0326458 A1 | 12/2013 | Kazda et al. |
| 2014/0068132 A1 | 3/2014 | Philip et al. |
| 2014/0068134 A1 | 3/2014 | Philip et al. |
| 2014/0092740 A1 | 4/2014 | Wang et al. |
| 2014/0098683 A1 | 4/2014 | Kumar et al. |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0211622 A1 | 7/2014 | Kumar et al. |
| 2014/0254388 A1 | 9/2014 | Kumar et al. |
| 2014/0269333 A1* | 9/2014 | Boerjesson .......... H04L 45/123 370/238 |
| 2015/0043575 A1 | 2/2015 | Kumar et al. |
| 2015/0109024 A1* | 4/2015 | Abdelfattah ........ G06F 17/5054 326/41 |
| 2015/0159330 A1 | 6/2015 | Weisman et al. |
| 2018/0033079 A1* | 2/2018 | Porter ..................... G06N 5/04 |

FOREIGN PATENT DOCUMENTS

| | | |
|---|---|---|
| JP | 6060316 B2 | 1/2017 |
| KR | 10-2013-0033898 A1 | 4/2013 |
| KR | 101652490 | 8/2016 |
| WO | 2010074872 A1 | 7/2010 |
| WO | 2013063484 A1 | 5/2013 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Gindin, R., et al., NoC-Based FPGA: Architecture and Routing, Proceedings of the First International Symposium on Networks-on-Chip (NOCS'07), May 2007, pp. 253-262.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA 11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Hestness, J., et al., Netrace: Dependency-Tracking for Efficient Network-on-Chip Experimentation, The University of Texas at Austin, Dept. of Computer Science, May 2011, 20 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B. et al., CoQoS: Coordinating QoS-Aware Shared Resources in NoC-based SoCs, J. Parallel Distrib. Comput., 71(5), May 2011, 14 pgs.

Lin, S., et al., Scalable Connection-Based Flow Control Scheme for Application-Specific Network-on-Chip, The Journal of China Universities of Posts and Telecommunications, Dec. 2011, 18(6), pp. 98-105.

Bolotin, Evgency, et al., "QNoC: QoS Architecture and Design Process for Network on Chip" 2004, 24 pages, Journal of Systems Architecture 50 (2004) 105-128 Elsevier.

Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.

Yang, J., et al., Homogeneous NoC-based FPGA: The Foundation for Virtual FPGA, 10th IEEE International Conference on Computer and Information Technology (CIT 2010), Jun. 2010, pp. 62-67.

Zaman, Aanam, et al., "Formal Verification of Circuit-Switched Network on Chip (NoC) Architectures using SPIN", IEEE © 2014, 8 pages.

International Search Report and Written Opinion for PCT/US2014/023625, dated Jul. 10, 2014, 9 pgs.

International Search Report and Written Opinion for PCT/US2014/012012, dated May 14, 2014, 10 pgs.

International Search Report and Written Opinion for PCT/US2014/037902, dated Sep. 30, 2014, 14 pgs.

International Search Report and Written Opinion for PCT/US2014/048190, dated Nov. 28, 2014, 11 pgs.

International Search Report and Written Opinion for PCT/US2014/060745, dated Jan. 21, 2015, 10 pgs.

International Search Report and Written Opinion for PCT/US2014/060879, dated Jan. 21, 2015, 10 pgs.

International Search Report and Written Opinion for PCT/US2014/060892, dated Jan. 27, 2015, 10 pgs.

International Search Report and Written Opinion for PCT/US2014/060886, dated Jan. 26, 2015, 10 pgs.

International Search Report and Written Opinion for PCT/US2013/064140, dated Jan. 22, 2014, 9 pgs.

International Search Report and Written Opinion for PCT/US2014/012003, dated Mar. 26, 2014, 9 pgs.

International Preliminary Report on Patentability for International Application No. PCT/US2013/064140, dated Apr. 23, 2015, 6 pages.

Office Action for Japanese Patent Application No. 2016-516030 dated Aug. 30, 2016, 2 pages, Japan Patent Office.

(56) References Cited

OTHER PUBLICATIONS

Decision to Grant for Japanese Patent Application No. 2016-516030 dated Nov. 22, 2016, 3 pages, untranslated, Japan Patent Office.
Office Action for Korean Patent Application No. 10-2016-7019093 dated Sep. 8, 2016, 3 pages plus 1 page English translation. KIPO, Korea.
Notice of Allowance for Korean Patent Application No. 10-2016-7019093 dated Dec. 5, 2016, 5 pages. KIPO, Korea.
Notice of Grant for Japanese Patent Application No. 2015-535898 dated Jan. 17, 2017, 3 pages, untranslated. Japan Patent Office.
Office Action for Japanese Patent Application No. 2015-535898 dated Oct. 25, 2016, 2 pages English, 2 pages untranslated copy. Japan Patent Office.

* cited by examiner

SYSTEM AND METHOD FOR NETWORK ON CHIP CONSTRUCTION THROUGH MACHINE LEARNING

BACKGROUND

Technical Field

Methods and example implementations described herein are directed to interconnect architecture, and more specifically, to reconfiguring Network on Chip (NoC) to customize traffic and optimize performance after NoC is designed and deployed.

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Taurus (as shown in FIG. 1(c)) are examples of topologies in the related art. Mesh and Taurus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs).

VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303, or bridge, may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication which thereby reduces the global average latency, as well as reduce the number of router nodes and links over which the higher bandwidth of this communication must be provisioned.

Moving two hosts closer together may make certain other hosts far apart since all hosts must fit into the 2D planar NoC topology without overlapping with each other. Thus, various tradeoffs must be made and the hosts must be placed after examining the pair-wise bandwidth and latency requirements between all hosts so that certain global cost and performance metrics is optimized. The cost and performance metrics can be, for example, average structural latency between all communicating hosts in number of router hops, or sum of bandwidth between all pair of hosts and the distance between them in number of hops, or some combination of these two. This optimization problem is known to be NP-hard and heuristic based approaches are often used. The hosts in a system may vary in shape and sizes with respect to each other, which puts additional complexity in placing them in a 2D planar NoC topology, packing them optimally while leaving little whitespaces, and avoiding overlapping hosts.

The optimization approaches introduced so far to determine the channel capacity, routes, host positions, etc., are useful when the exact traffic profile is known in advance at the NoC design time. If the precise traffic profile is not known at the design time, and the traffic profile changes during the NoC operation based on the SoC application's requirements, then the NoC design must allow these adjustments. For the NoC to allow these changes, the NoC must be designed so that it has knowledge of the changes that may occur in the traffic profile in a given system and ensure that any combination of allowable traffic profiles are supported by the NoC hardware architecture.

SUMMARY

Aspects of the present disclosure can include a method of generating a Network on Chip (NoC). The method can include applying a process on a NoC specification to determine, from a plurality of NoC mapping strategies, ones of the plurality of NoC mapping strategies that meet a threshold for a cost function; executing the ones of the plurality of NoC mapping strategies to generate one or more NoC mappings; scoring the one or more NoC mappings based on the cost function; and generating the NoC from an implementation of a selected mapping from the one or more NoC mappings.

Aspects of the present disclosure can include a non-transitory computer readable medium, storing instructions for generating a Network on Chip (NoC). The instructions can include applying a process on a NoC specification to determine, from a plurality of NoC mapping strategies, ones of the plurality of NoC mapping strategies that meet a threshold for a cost function; executing the ones of the plurality of NoC mapping strategies to generate one or more NoC mappings; scoring the one or more NoC mappings based on the cost function; and generating the NoC from an implementation of a selected mapping from the one or more NoC mappings.

Aspects of the present disclosure can include an apparatus, which can involve a processor configured to generate a Network on Chip (NoC). The processor can be configured to apply a process on a NoC specification to determine, from a plurality of NoC mapping strategies, ones of the plurality of NoC mapping strategies that meet a threshold for a cost function; execute the ones of the plurality of NoC mapping strategies to generate one or more NoC mappings; score the one or more NoC mappings based on the cost function; and generate the NoC from an implementation of a selected mapping from the one or more NoC mappings.

DETAILED DESCRIPTION

Figure 1A:
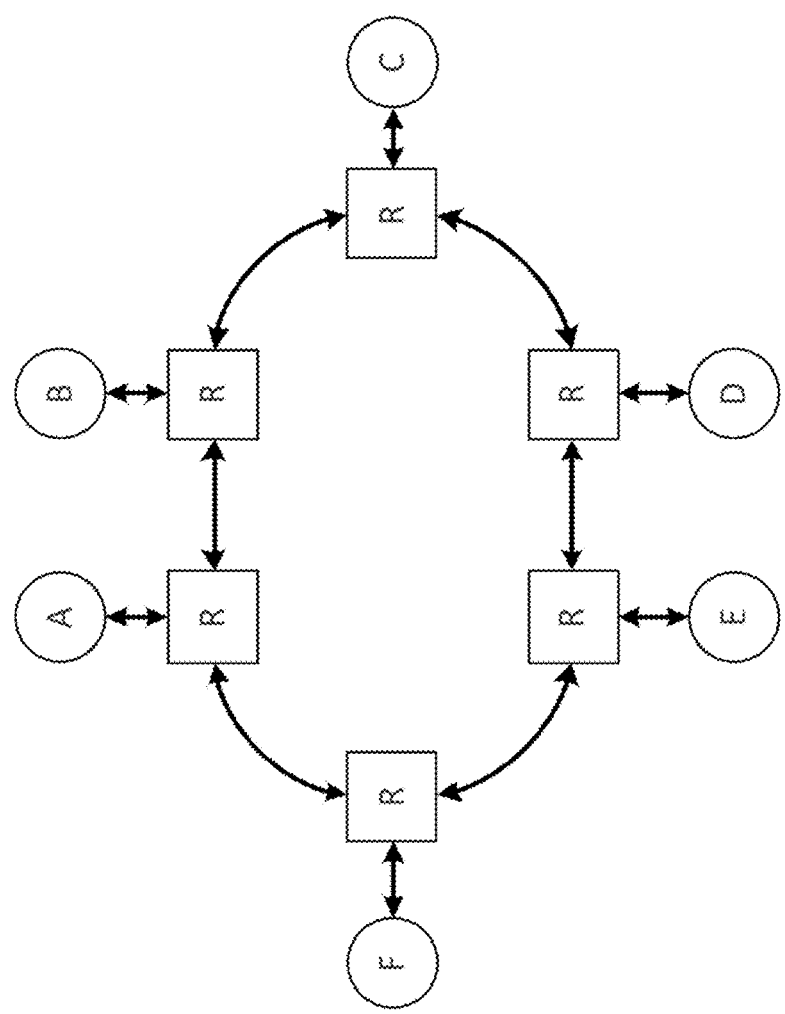
FIGS. 1(a), 1(b) 1(c) and 1(d) illustrate examples of Bidirectional ring, 2D Mesh, 2D Taurus, and 3D Mesh NoC Topologies.
Figure 1B:
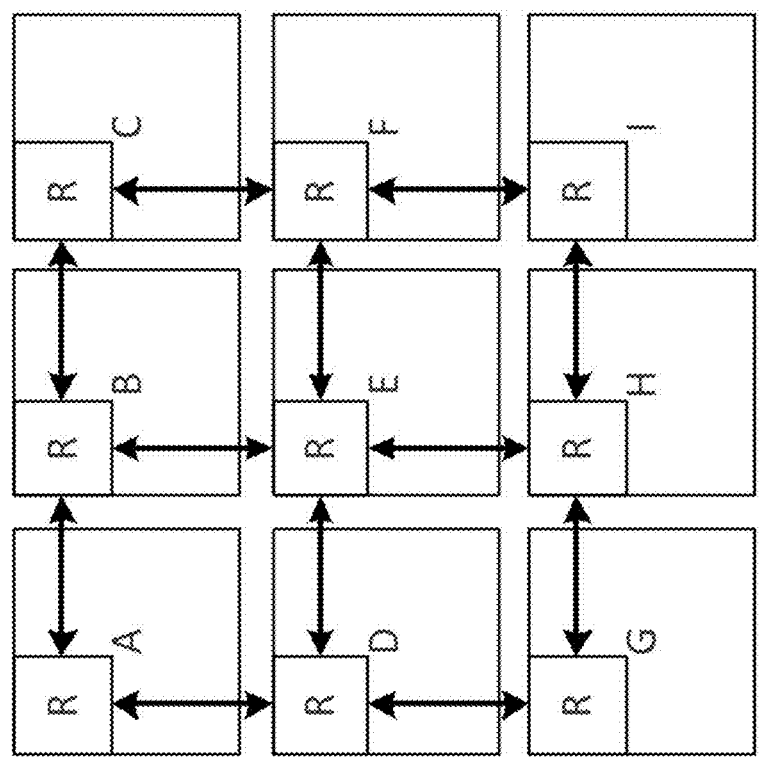
Figure 1C:
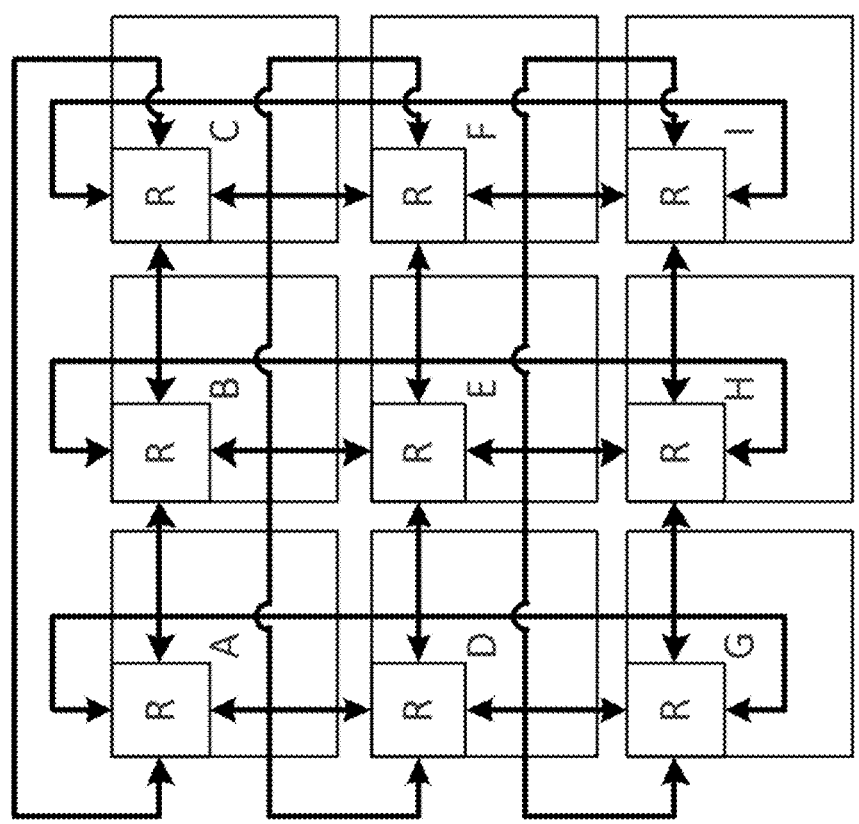
Figure 1D:
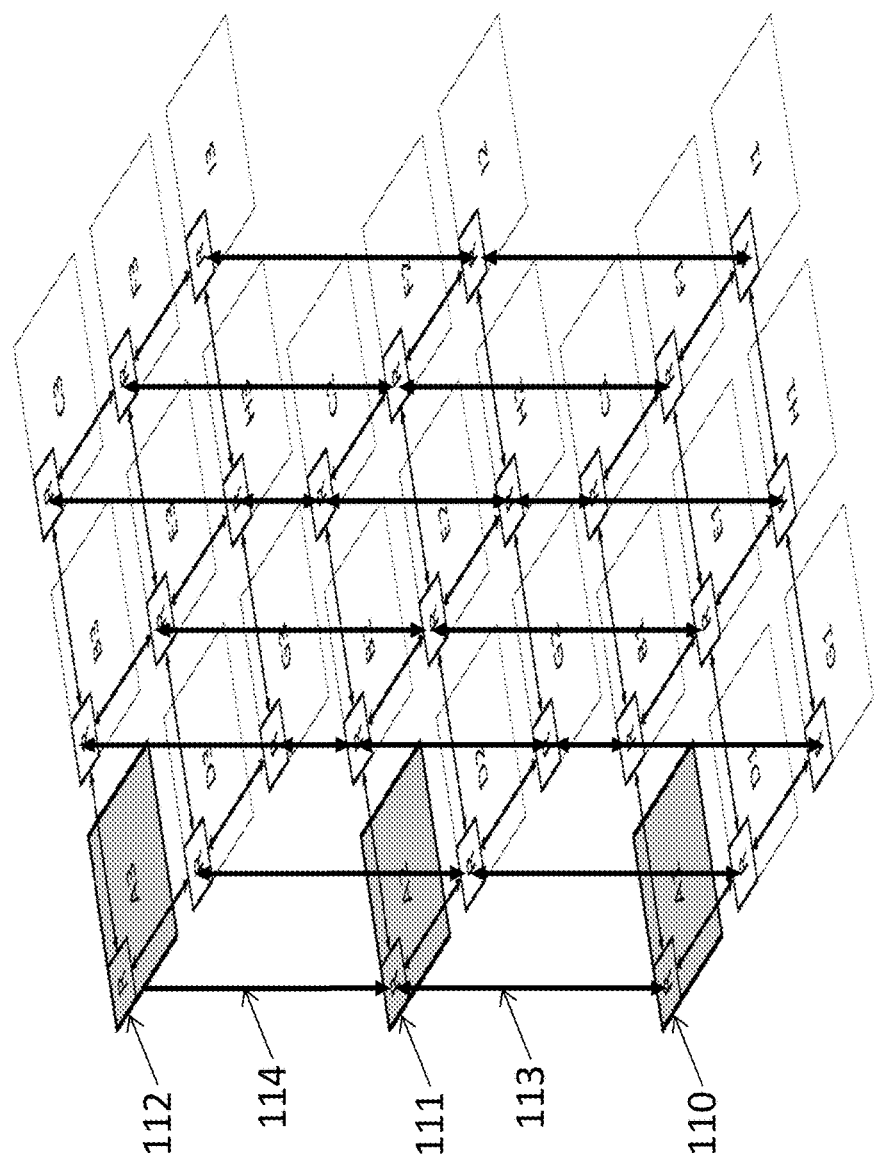
Figure 2A:
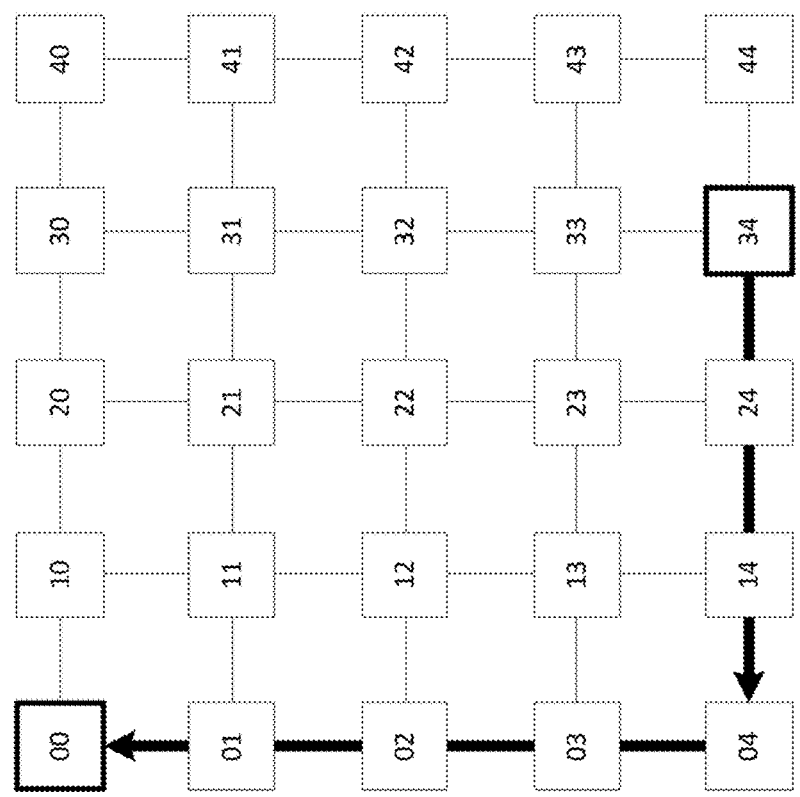
FIG. 2(a) illustrates an example of XY routing in a related art two dimensional mesh.
Figure 2B:
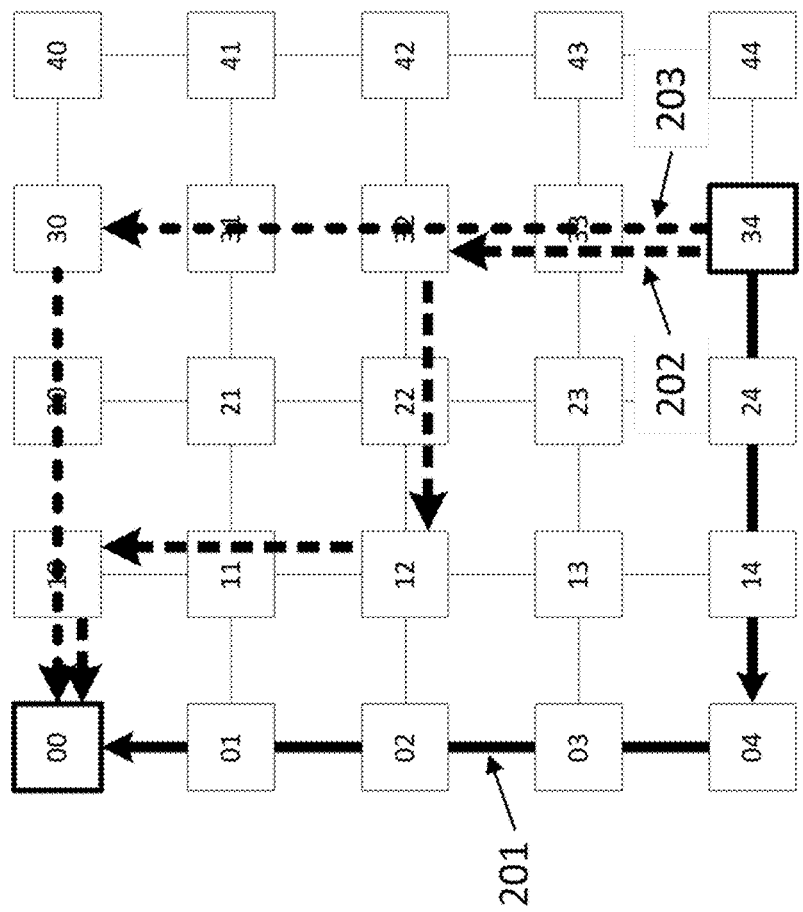
FIG. 2(b) illustrates three different routes between a source and destination nodes.
Figure 3A:
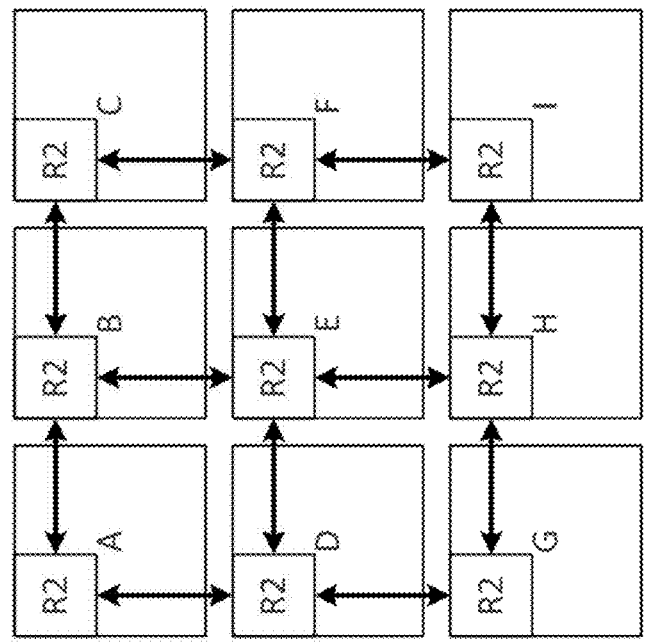
FIG. 3(a) illustrates an example of a related art two layer NoC interconnect.
Figure 3A:
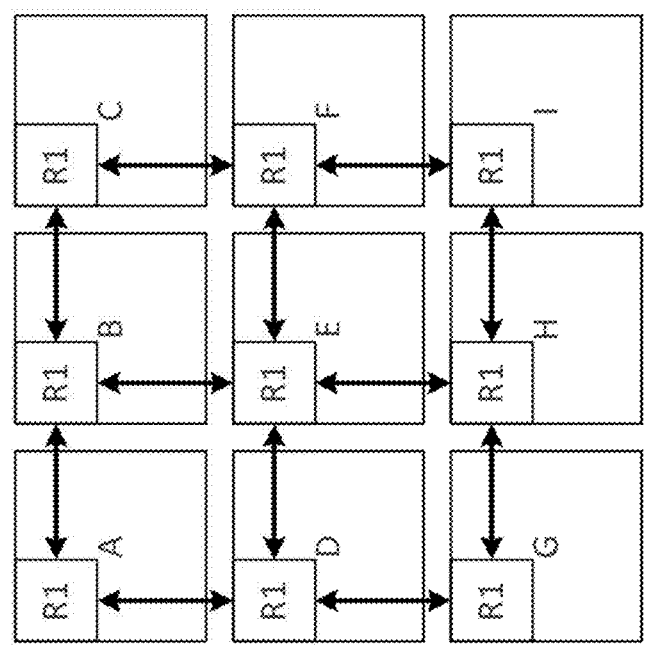
Figure 3B:
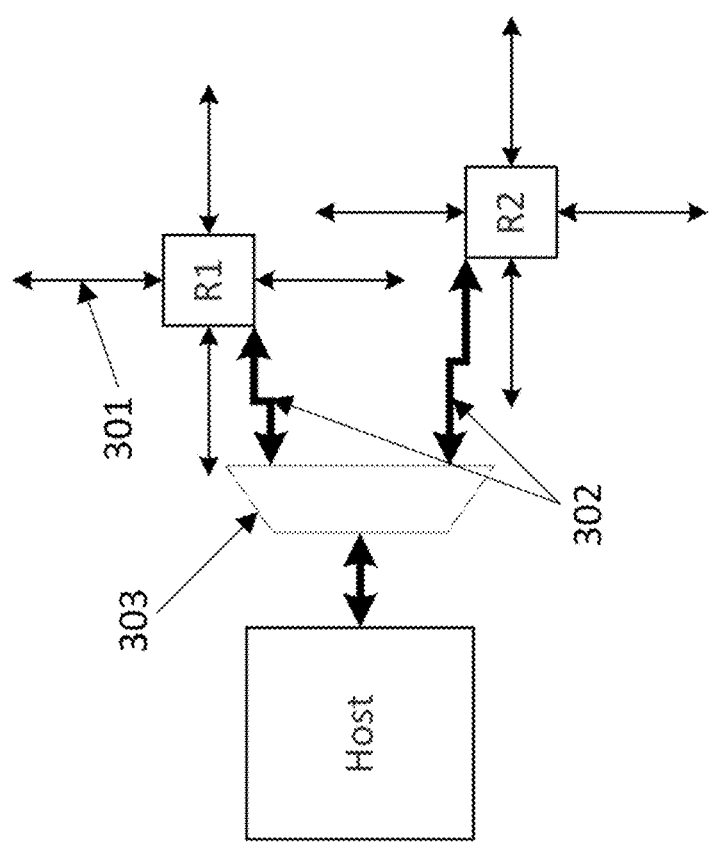
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

In example implementations, a NoC interconnect is generated from a specification by utilizing design tools. The specification can contain constraints such as bandwidth/Quality of Service (QoS)/latency attributes that is to be met by the NoC, and can be in various software formats depending on the design tools utilized. Once the NoC is generated through the use of design tools on the specification to meet the specification requirements, the physical architecture can be implemented either by manufacturing a chip layout to facilitate the NoC or by generation of a register transfer level (RTL) for execution on a chip to emulate the generated NoC, depending on the desired implementation. Specifications may be in common power format (CPF), Unified Power Format (UPF), or others according to the desired specification. Specifications can be in the form of traffic specifications indicating the traffic, bandwidth requirements, latency requirements, interconnections and so on depending on the desired implementation. Specifications can also be in the form of power specifications to define power domains, voltage domains, clock domains, and so on, depending on the desired implementation.

Example implementations are directed to the utilization of machine learning based algorithms. In the related art, a wide range of machine learning based algorithms have been applied to image or pattern recognition, such as the recognition of obstacles or traffic signs of other cars, or the categorization of elements based on a specific training. In view of the advancement in power computations, machine learning has become more applicable for the generation of NoCs and for the mapping of traffic flows of NoCs.

A distributed NoC interconnect connects various components in a system on chip with each other using multiple routers and point to point links between the routers. The traffic profile of a SoC includes the transactions between various components in the SoC and their properties (e.g., Quality of Service (QoS), priority, bandwidth and latency requirements, transaction sizes, etc.). The traffic profile information may be used to determine how various transactions will be routed in the NoC topology, and accordingly provision the link capacities, virtual channels and router nodes of the NoC. Accurate knowledge of the traffic profile can lead to an optimized NoC hardware with minimal overprovisioning in terms of link wires, virtual channel buffers and additional router nodes. A variety of SoCs today are designed to run a number of different applications; the resulting NoC traffic profile therefore may differ based on how and in what market segments the SoC is deployed, and what applications are supported. Supporting a variety of traffic profiles offers several challenges in the NoC design and optimization. Even if multiple traffic profiles are supported functionally, the traffic profile observed in a particular setting may be different from the set of profiles for which the NoC is optimized, leading to sub-optimal power consumption and NoC performance.

Example implementations described herein are directed to solutions for 2-D, 2.5-D and 3-D NoC interconnects. The example implementations may involve various aspects, such as: 1) designing a NoC to one or more traffic profiles of a traffic specification by mapping their transactions to NoC and allocating routes, virtual channels, and layers; 2) supporting hardware reconfigurability in the NoC to be able to optimize the NoC performance for a given subset of traffic profiles present in a SoC; 3) using example implementations herein to process each flow to optimize the mapping of the flows to the NoC hardware; 5) based on the determined flows, generating the reconfiguration information to be loaded into the NoC hardware; and 6) finally transmitting the reconfiguration information to the NoC in a format that can be loaded into NoC reconfiguration hardware.

Example implementations may utilize machine learning which can involve a large variety of algorithms.

Figure 4:
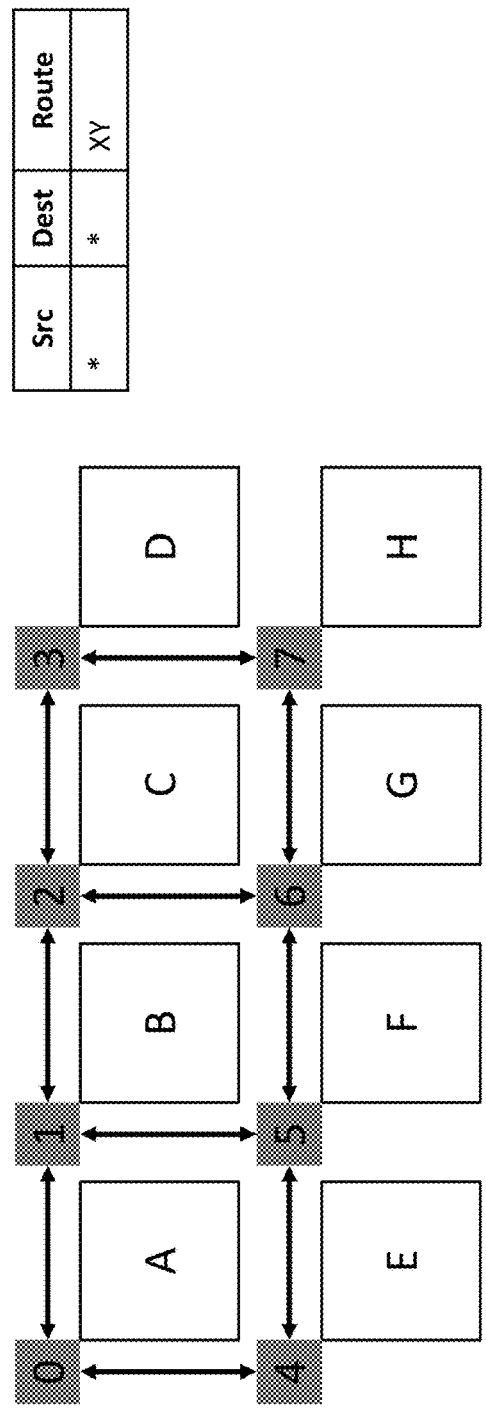
FIG. 4 illustrates a 4×2 mesh NoC mapping three traffic profiles using XY routing.

FIG. 4 illustrates an example of a traffic specification including multiple traffic profiles mapped to the NoC interconnect and mapping the transactions. Here there are three traffic profiles that need to be supported in a NoC interconnect connecting eight hosts, A, B, C, D, E, F, G, H. The inter-component communications of the three traffic profiles are as follows:

Traffic Profile 1: A<->B; A<->G;
Traffic Profile 2: A<->C; B<->D; D<->G; E<->F;
Traffic Profile 3: G<->C;

The example NoC of FIG. 4 is a 4×2 mesh topology. To support the three traffic profiles, routes and virtual channels are allocated for each transaction of all of the traffic profiles. In this case, a single NoC layer is allocated (for additional bandwidth and channels, more NoC layers may be allocated). A number of schemes can be used for allocation of NoC channels and routes and multiple layers, some of which are described in U.S. application Ser. Nos. 13/599,559, 13/745,684, and 13/752,226, hereby incorporated by reference for all purposes in their entirety. In this example, XY routes are used for all transactions, and the links and router nodes along the routes of all transactions in the three traffic profiles are allocated as shown in FIG. 4. Virtual channels allocated at various links between routers are omitted for clarity.

In example implementations, a NoC is generated from a specification with agents, bridges and a traffic specification design our NoC with agents and bridges and the traffic specification, whereupon a mapping algorithm attempts to map the traffic flows in an incremental way. The order in which the flows are selected for mapping can affect the outcome of the NoC generation (e.g., selecting the flows from highest bandwidth to lowest bandwidth, only flows meeting a QoS, threshold, etc.).

Figure 5:
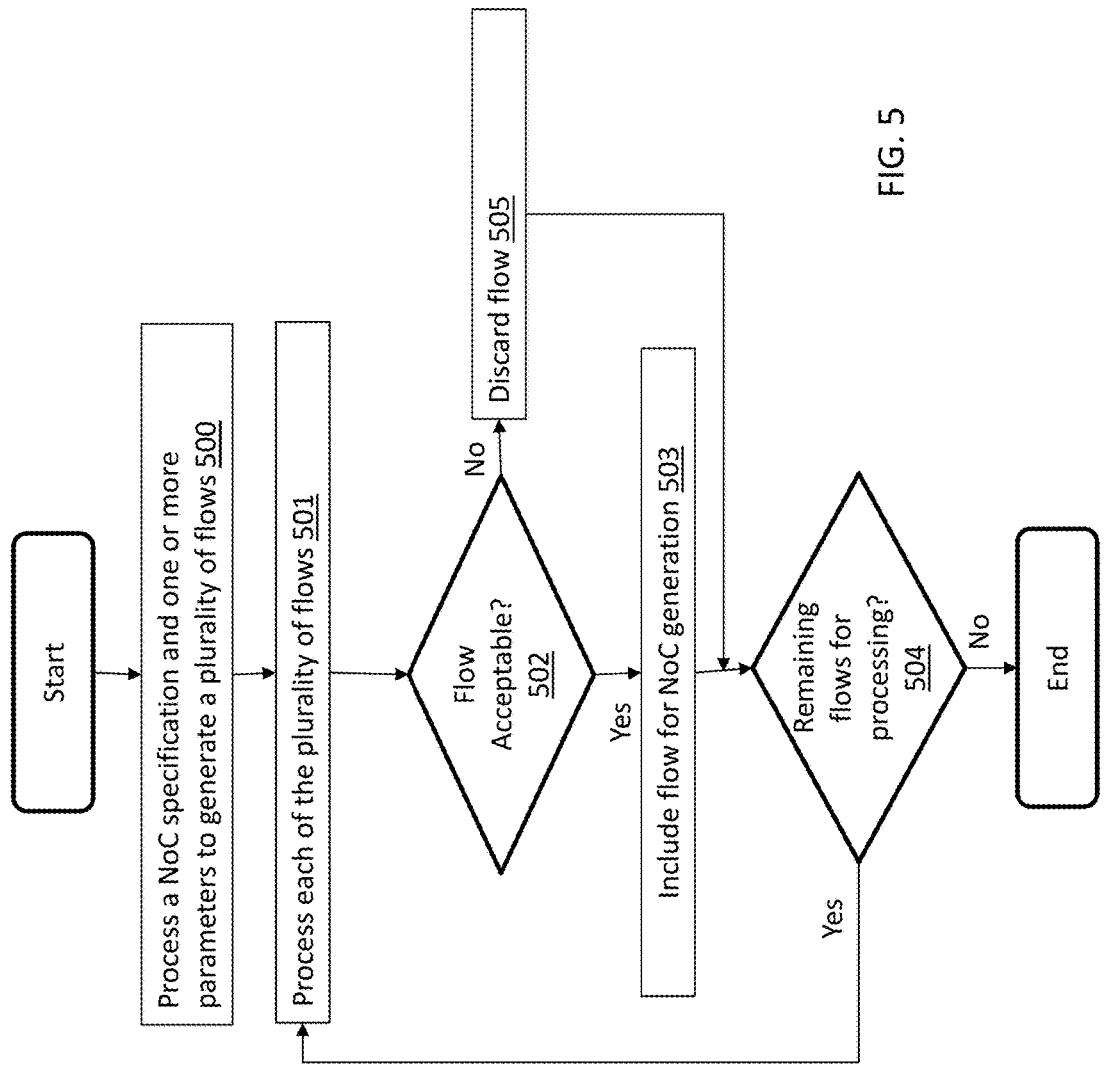
FIG. 5 illustrates a flow for utilizing a NoC learning algorithm, in accordance with an example implementation.

FIG. 5 illustrates a flow in accordance with an example implementation. In example implementations of the present disclosure, a NoC specification (e.g. including traffic specification and power specification) is processed for characteristics of the NoC at 501. Such characteristics can include the presence of certain protocols, the size of the NoC in X or Y axis, the number of hosts, the number of bridges, flow characteristics of the traffic, and so on in accordance with the desired implementation. When the machine learning algorithm is undergoing training, such characteristics for the specification can allow the machine learning algorithms to differentiate between other NoC specifications that cause the NoC to have different characteristics.

At 502, the characteristics are provided to the trained machine learning algorithm, which processes the characteristics against a library of selection strategies. In example implementations, a library of selection strategies can be incorporated, whereupon the outcome of the NoC generation is obtained at 503. In example implementations, the strategies can be selected at random and the NoC is generated according to the specification with the traffic flows mapped according to the strategy. The generated NoC is scored according to a desired metric, whereupon the NoCs that meet the desired threshold are retained.

Strategies are selected from the set of available strategies based on the machine learning algorithm. In example implementations, the machine learning algorithm will determine for the set of the available strategies, which of the set of available strategies will produce a NoC that meets the threshold for the desired characteristics. In example implementations, the machine learning algorithm is trained by being given NoC specifications with various characteristics, and corresponding outputted generated NoCs and their characteristics after applying various mapping strategies to the specifications. That is, for each strategy, a mapping is conducted for the specification in the training set. From this training, the machine learning algorithm can give a score (e.g. normalized score between zero and one) to indicate the degree to which the desired characteristics can be met.

In example implementations, flows are ordered and processed on a flow by flow basis wherein each flow can be marked. Each flow can be ordered according to desired characteristics, and can be marked specifically in accordance with the desired implementation. For example, if a certain flow has a certain characteristic that can be indicated with a Boolean flag, then the flow can be marked with a Boolean flag, or with any other desired implementation to describe the traffic of the flow.

In example implementations, the strategies can be implemented as a vector that can be applied to traffic flows. Each bit or set of bits in the vector can indicate attributes of the strategy (e.g. order by transmitting interface first, then by the number of flits that are in the traffic, and then by the presence or non-presence of latency sensitive traffic). In example implementations, the ordering of actions within the vector can define the strategy. The vector can be extended and customized to incorporate additional strategies or characteristics as defined by the operator in accordance with the desired implementation.

In example implementations, the vector can include various attributes that define the strategy space, and can be made up of a combination of different strategy aspects. For example, the vector can include a set of bits to indicate if the routing should be XY routing, YX routing, or other kind of routing, or undefined.

The number of possible mappings for a given strategy may be overly large. Through the application of machine learning, example implementations restrict or identify with a certain probability the best strategies for a given specification among the strategy space. In example implementations, applying machine learning algorithms among a set of strategies will indicate an output of strategies having a high probability to meet the desired threshold characteristics. In one aspect of the example implementations, the mapping procedure can provide an optimal result or a mapping that meets a threshold.

Through the use of example implementations, instead of being forced to explore the space randomly, or instead being forced to explore the entire space of the possible strategies, the known strategy space can be reduced to a subset of strategies that contain, or have a probability meeting a threshold of containing mappings that meet a threshold for the desired characteristics. In example implementations, the machine learning algorithms can determine if a certain input belongs or not to a category, or given input they will try to predict a certain output.

Figure 6:
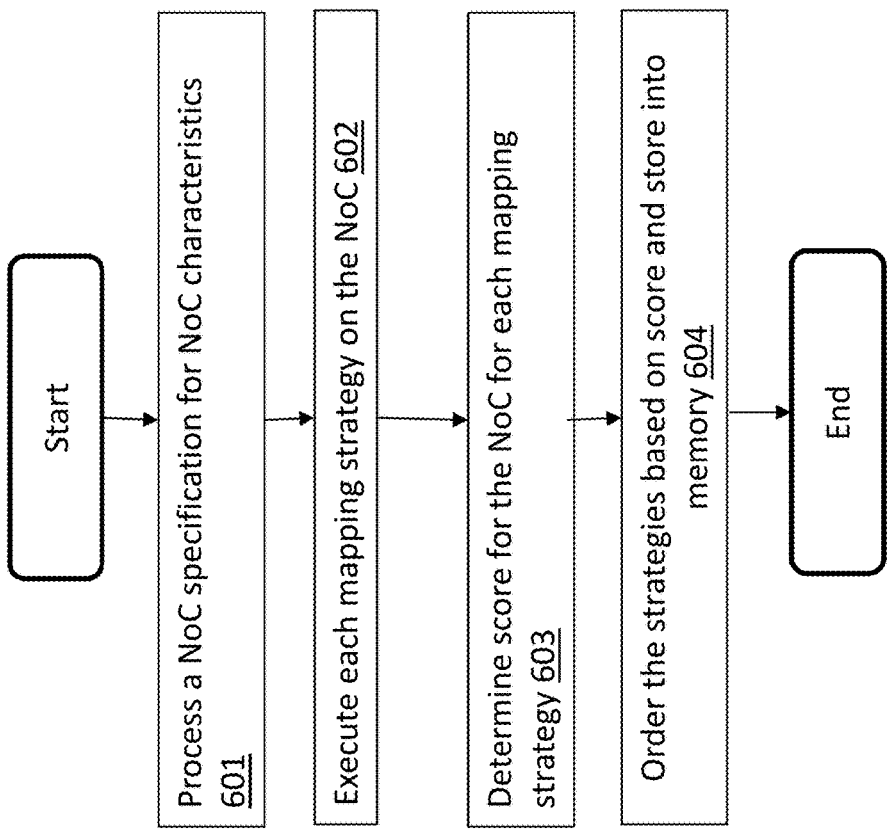
FIG. 6 illustrates an example flow for machine learning training, in accordance with an example implementation.

FIG. 6 illustrates an example flow for machine learning training, in accordance with an example implementation. At 601, a NoC is provided with input values such as parameters, and flows. At 602, the NoC is mapped according to each strategy within the strategy space. At 603, the mapped NoC is scored according to a cost function. The cost function can be a cost function based on buffer cost, link cost, bandwidth cost, latency cost, or other desired cost depending on the desired implementation. The scoring is conducted through the execution of a performance simulation of the NoC. At 604, the mapping strategies are ordered based on the score associated with the mapping strategy, and the NoC and scores associated with the mapping strategy are stored in a database. Through repeated input of various NoCs, the machine learning algorithm can thereby maintain a database that scores a library of NoCs according to strategy space and cost function.

In example implementations, the flow of FIG. 6 is executed on a number of NoCs to generate the training set for the machine learning algorithm. Once the machine learning algorithm receives a training set, the machine learning algorithm can thereby select mapping strategies for a given NoC.

Figure 7:
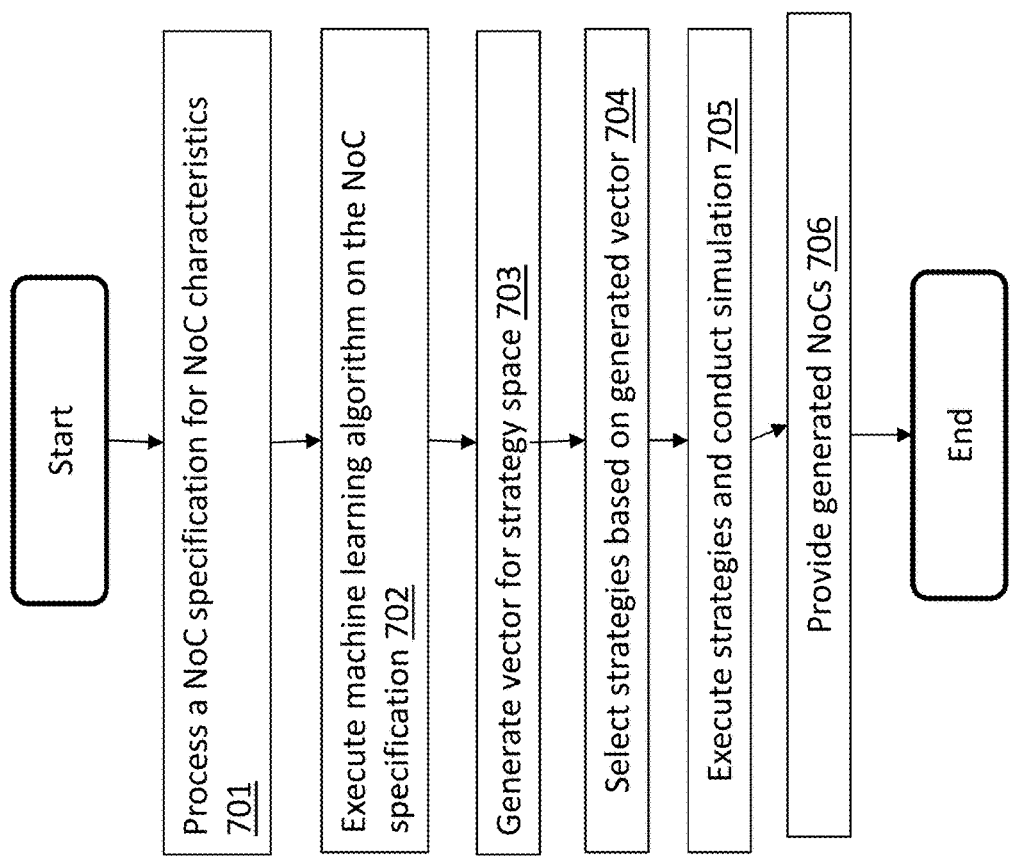
FIG. 7 illustrates an example flow for generating a list of strategies through use of machine learning, in accordance with an example implementation.

FIG. 7 illustrates an example flow for utilizing machine learning to select a strategy, in accordance with an example implementation. At 701, a NoC specification is processed for NoC characteristics. At 702, the machine learning algorithm is executed on the NoC to determine which strategies would meet a threshold for a cost function. At 703, the vector of mapping strategies is filled to indicate which strategies in the strategy space meet the threshold for the cost function, and which do not. At 704, the strategies are selected based on the strategies indicated as meeting the threshold for the cost function in the vector. At 705, the mapping strategies are executed for each of the strategies indicated as meeting the threshold for the cost function to generate a NoC. At 706, the generated NoCs are provided for incorporation into the NoC hardware, along with the score in accordance with the cost function.

Thus, given a NoC including the specification indicating the hosts, the parameters and the traffic, and a strategy space, a cost function can be utilized to determine a mapping based on the pool of different available strategies.

Figure 8:
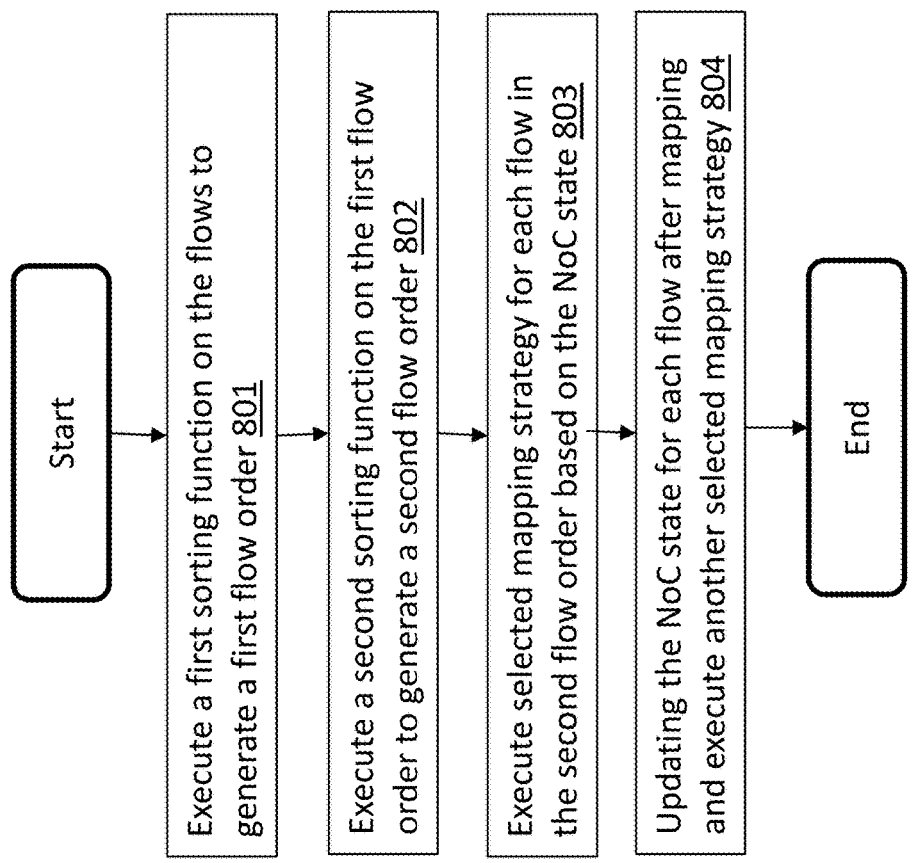
FIG. 8 illustrates a flow chart for incorporating flow order functions in accordance with an example implementation.

FIG. 8 illustrates a flow chart for incorporating flow order functions in accordance with an example implementation. Specifically, FIG. 8 illustrates an ordering of flows through the use of a sorting function. In an example implementation, at 801, a first sorting function is executed on the flows of the NoC to create a first order of flows that specifies an order in which traffic flows are mapped. The first sorting function can sort the flows based on any order according to the desired implementation (e.g. bandwidth, latency, number of VCs used, link cost, etc.). The order of flows can then be mapped according to the NoC strategy to generate the NoC if desired, or a second sorting function can be executed on the first order of flows if desired at 802. The second sorting function can also be any sorting function according to the desired implementation. In such an example implementation, a subset of the traffic flows is kept based on a threshold for the first sorting function, and the subset is then further sorted according to the desired second sorting function. Thus it is possible through example implementations to execute sorting functions within subsets of sorted flows to get a desired order for the NoC generation (e.g. sorting first by bandwidth, and then by number of VCs for a subset of the flows). At 803, the selected mapping strategy can then be applied to the ordered flows to generate the NoC. In further example implementations, each individual flow can be mapped according to a mapping strategy selected based on a NoC state. In such an example implementation, a machine learning process is utilized to select a mapping strategy for each flow based on the state of the NoC. Once a flow is mapped by the machine learning process, the NoC state is updated at 804 wherein the flow can be iterated back to 803 for the machine learning process to select another mapping strategy for the subsequent flow in the ordered flows.

Figure 9:
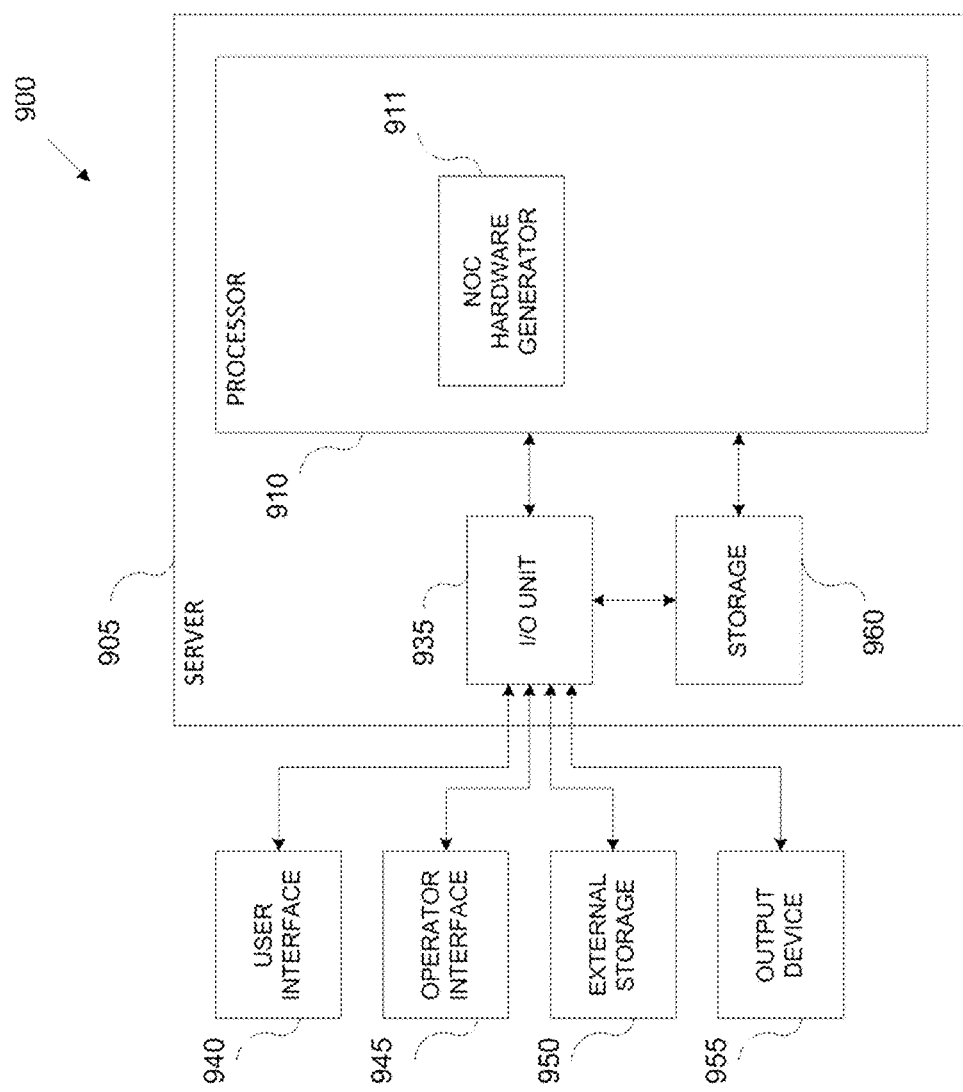
FIG. 9 illustrates a computer/server block diagram upon which the example implementations described herein may be implemented.

FIG. 9 illustrates an example computer system 900 on which example implementations may be implemented. The computer system 900 includes a server 905 which may involve an I/O unit 935, storage 960, and a processor 910 operable to execute one or more units as known to one of skill in the art. The term "computer-readable medium" as used herein refers to any medium that participates in providing instructions to processor 910 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 940 and operator interfaces 945 which may utilize input devices such as a keyboard, mouse, touch device, or verbal command.

The server 905 may also be connected to an external storage 950, which can contain removable storage such as a portable hard drive, optical media (CD or DVD), disk media or any other medium from which a computer can read executable code. The server may also be connected an output device 955, such as a display to output data and other information to a user, as well as request additional information from a user. The connections from the server 905 to the user interface 940, the operator interface 945, the external storage 950, and the output device 955 may via wireless protocols, such as the 802.11 standards, Bluetooth® or cellular protocols, or via physical transmission media, such as cables or fiber optics. The output device 955 may therefore further act as an input device for interacting with a user.

Processor 910 can be configured to generate a NoC through execution of NoC hardware generator 911. NoC hardware generator 911 can be configured to apply a process on a NoC specification to determine, from a plurality of NoC mapping strategies, ones of the plurality of NoC mapping strategies that meet a threshold for a cost function; execute the ones of the plurality of NoC mapping strategies to generate one or more NoC mappings; score the one or more NoC mappings based on the cost function; and generate the NoC from an implementation of a selected mapping from the one or more NoC mappings as illustrated in the flow of FIG. 6. The process applied on the NoC specification can be a machine learning algorithm trained against the cost function for the plurality of NoC mapping strategies. Such a cost function can involve one or more of a NoC bandwidth (e.g. as evaluated through a simulation tool or through other desired implementations), NoC buffer size, NoC latency, and NoC link cost. The plurality of mapping strategies can be represented as a vector indicative of which of the plurality of mapping strategies meet the threshold of the cost function; wherein the ones of the plurality of mapping strategies are selected based on the vector, and can be selected by NoC hardware generator 911 through a machine learning process.

As illustrated in the flow of FIG. 5, NoC hardware generator 911 can be configured to execute the ones of the plurality of mapping strategies on a flow by flow basis for each of the ones of the plurality of mapping strategies, wherein each flow is kept or discarded for the mapping based on a minimization of the cost function.

NoC hardware generator 911 can also be configured to execute the ones of the plurality of NoC mapping strategies to generate one or more NoC mappings through execution of a first sorting function configured to specify an order in which traffic flows are to be mapped as illustrated in FIG. 8. Upon execution of the sorting function, the machine learning algorithm utilized can determine whether the mapping of the subsequent flow is to be mapped by the same NoC mapping strategy, or if another mapping function is to be executed on the subsequent flow based on the NoC state as illustrated in FIG. 8. In example implementations, additional sorting functions can be executed to modify the order in which traffic flows are mapped during any time of the flow mapping process. In this manner, flows can be reordered to reflect the desired implementation. The NoC state can be updated after each mapped flow so that the machine learning algorithm can determine whether to change the flow order or execute a different mapping function. In example implementations, the changing of the flow order or execution of a different mapping function can also be conducted manually through a user command if desired.

In an example implementation, the sorting function can be replaced with a machine learning process configured to determine the order in which traffic flows are to be mapped based on external constraints (e.g. requirements specified in the specification, as input by a user command), and the state of the NoC. The machine learning process can be trained against a set of possible external constraints and NoC states to provide an algorithm configured to provide a order for the traffic flows.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method of generating a Network on Chip (NoC), the method comprising:
 applying a process on a NoC specification to determine, from a plurality of NoC mapping strategies, ones of the plurality of NoC mapping strategies that meet a threshold for a cost function;
 executing the ones of the plurality of NoC mapping strategies to generate one or more NoC mappings;
 scoring the one or more NoC mappings based on the cost function; and
 generating the NoC from an implementation of a selected mapping from the one or more NoC mappings;
 wherein the process is a machine learning algorithm trained against the cost function for the plurality of NoC mapping strategies.

2. The method of claim 1, wherein the cost function is based on at least one of: a NoC bandwidth, NoC buffer size, NoC latency, and NoC link cost.

3. The method of claim 1, wherein the plurality of mapping strategies are represented as a vector indicative of which of the plurality of mapping strategies meet the threshold of the cost function; wherein the ones of the plurality of mapping strategies are selected based on the vector.

4. The method of claim 3, wherein the ones of the plurality of mapping strategies is selected based on a machine learning process.

5. The method of claim 1, wherein the executing the ones of the plurality of mapping strategies is conducted on a flow by flow basis for each of the ones of the plurality of mapping strategies, wherein each flow is kept or discarded for the mapping based on a minimization of the cost function.

6. The method of claim 1, wherein the executing the ones of the plurality of NoC mapping strategies to generate one or more NoC mappings comprises executing a first sorting function configured to specify an order in which traffic flows are to be mapped.

7. The method of claim 6, wherein the executing the ones of the plurality of NoC mapping strategies to generate one or more NoC mappings comprises executing a second sorting function configured to modify the order in which the traffic flows are to be mapped.

8. The method of claim 6, further comprising, for each flow in the order in which traffic flow is mapped, selecting a mapping strategy, based on a NoC state, mapping the each flow according to the selected mapping strategy, and updating the NoC state after mapping the each flow.

9. The method of claim 1, wherein the executing the ones of the plurality of NoC mapping strategies to generate one or more NoC mappings comprises executing a machine learning process to determine an order in which traffic flows are to be mapped.

10. A non-transitory computer readable medium storing instructions for generating a Network on Chip (NoC), the instructions comprising:
 applying a process on a NoC specification to determine, from a plurality of NoC mapping strategies, ones of the plurality of NoC mapping strategies that meet a threshold for a cost function;

executing the ones of the plurality of NoC mapping strategies to generate one or more NoC mappings;
scoring the one or more NoC mappings based on the cost function; and
generating the NoC from an implementation of a selected mapping from the one or more NoC mappings;
wherein the process is a machine learning algorithm trained against the cost function for the plurality of NoC mapping strategies.

11. The non-transitory computer readable medium of claim 10, wherein the cost function is based on at least one of: a NoC bandwidth, NoC buffer size, NoC latency, and NoC link cost.

12. The non-transitory computer readable medium of claim 10, wherein the plurality of mapping strategies are represented as a vector indicative of which of the plurality of mapping strategies meet the threshold of the cost function; wherein the ones of the plurality of mapping strategies are selected based on the vector.

13. The non-transitory computer readable medium of claim 12, wherein the ones of the plurality of mapping strategies is selected based on a machine learning process.

14. The non-transitory computer readable medium of claim 10, wherein the executing the ones of the plurality of mapping strategies is conducted on a flow by flow basis for each of the ones of the plurality of mapping strategies, wherein each flow is kept or discarded for the mapping based on a minimization of the cost function.

15. The non-transitory computer readable medium of claim 10, wherein the executing the ones of the plurality of NoC mapping strategies to generate one or more NoC mappings comprises executing a first sorting function configured to specify an order in which traffic flows are to be mapped.

16. The non-transitory computer readable medium of claim 15, wherein the executing the ones of the plurality of NoC mapping strategies to generate one or more NoC mappings comprises executing a second sorting function configured to modify the order in which the traffic flows are to be mapped.

17. The non-transitory computer readable medium of claim 15, further comprising, for each flow in the order in which traffic flow is mapped, selecting a mapping strategy, based on a NoC state, mapping the each flow according to the selected mapping strategy, and updating the NoC state after mapping the each flow.

18. The non-transitory computer readable medium of claim 15, wherein the executing the ones of the plurality of NoC mapping strategies to generate one or more NoC mappings comprises executing a machine learning process to determine an order in which traffic flows are to be mapped.

19. A method of generating a Network on Chip (NoC), the method comprising:
applying a process on a NoC specification to determine, from a plurality of NoC mapping strategies, ones of the plurality of NoC mapping strategies that meet a threshold for a cost function;
executing the ones of the plurality of NoC mapping strategies to generate one or more NoC mappings;
scoring the one or more NoC mappings based on the cost function; and
generating the NoC from an implementation of a selected mapping from the one or more NoC mappings;
wherein the executing the ones of the plurality of NoC mapping strategies to generate one or more NoC mappings comprises executing a machine learning process to determine an order in which traffic flows are to be mapped.

* * * * *